UNITED STATES PATENT OFFICE 2,275,024

ORGANIC HEXAMETHINE COMPOUND

Walter Zeh, Dessau, Anhalt, Germany, assignor, by mesne assignments, to General Aniline & Film Corporation, New York, N. Y., a corporation of Delaware No Drawing. Application June 22, 1937, Serial No. 149,677. In Germany May 18, 1933

5 Claims. (Cl. 260—240)

My present invention relates to a process of producing unsymmetrical hepta-carbocyanine dyes and more particularly to a process wherein equivalent quantities of a quaternary ammonium salt of a heterocyclic base and a pentamethine dyestuff of the general formula

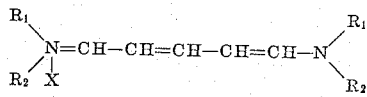

wherein $R_1$ = aryl,
$R_2$ = hydrogen, alkyl or aralkyl,
X = an acid residue such as chlorine or bromine, are caused to interact in the presence of an alkaline condensing agent and the hexamethine dyestuff thus produced is separated and caused to react with the equivalent quantity of a quaternary ammonium salt of another heterocyclic base in presence of an alkaline condensing agent to produce an unsymmetrical heptacarbocyanine.

It is an object of the present invention to provide a process by which the yield of unsymmetrical heptacarbocyanine is substantially increased. Further objects will be seen from the detailed specification following hereafter.

This application is to be regarded as a continuation in part of my copending application Ser. No. 725,214 filed May 11, 1934.

This invention is based on the observation that the intermediate product for making the unsymmetrical heptacarbocyanine is obtained in particularly good yield if there is used as a component of the reaction the pentamethine-di-(α-methyl-phenmorpholide)-bromide of the formula

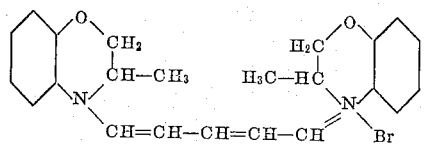

The α-methyl-phenmorpholine serving for making this pentamethine compound is obtained by the reduction of ortho-nitrophenacetol with tin and hydrochloric acid. For making the pentamethine compound the α-methyl-phenmorpholine is caused to react with pyridine and cyanogen bromide. The course of the reaction is quite analogous to that described by W. König ("Journal f. prakt. Chem." volume 69, 1904, page 123) for making a dyestuff from aniline, cyanogen bromide and pyridine. The bromide of the pentamethine dyestuff from α-methyl-phenmorpholine crystallizes in the form of a red powder having a violet iridescence; it is soluble in alcohol and in pyridine to intensely red solutions and is sparingly soluble in water. The methanol solution shows an absorption maximum of about 5080 A. U. (extremely flat).

The following example illustrates the invention: 3.05 grams of 2-methyl-benzthiazole-ethyl-iodide (1/100 mol) and 5.39 grams of pentamethine-di-(α-methyl-phenmorpholide)-bromide (1/100 mol) are dissolved together in 50 cc. of absolute alcohol by prolonged boiling. When dissolution is complete, 3.16 grams of pyridine (1/25 mol) are added and heating is continued for 1 hour on the steam bath, whereby the greater part of the alcohol must be evaporated. From time to time a drop of the solution is removed, strongly diluted and observed in the spectroscope. This test shows in the course of the reaction that the flat band of the pentamethine dyestuff becomes ever weaker whereas the absorption band of the intermediate product formed, namely at 6080 A. U., becomes ever stronger. When the band of the pentamethine dyestuff has nearly completely vanished, the heating is interrupted. The mixture of pure deep blue color is made up to 50 cc. with boiling alcohol, some concentrated potassium iodide solution is added and the whole is diluted with water added in drops until crystallization sets in. The crystallization is completed by cooling in ice. After some hours the crystals are filtered, whereby a crude product is obtained amounting to about 90 per cent of the theoretical. The violet crystalline mass thus obtained is soluble in alcohol to a pure blue solution and may be used without further purification for making the hepta-carbocyanine dyestuff.

1/100 mol of this intermediate product and 1/100 mol of 2-methyl-benzselenazole ethyl iodide are dissolved together in the smallest possible quantity of boiling absolute alcohol and there is added to the solution 1/100 mol of sodium ethylate (dissolved in 15 cc. of alcohol). The solution becomes almost immediately green. The whole is now boiled for a few minutes and cooled; a little aqueous potassium iodide solution is now added, whereupon the unsymmetrical 1:1'-di-ethyl-benzthio-benzseleno-hepta-carbocyanine iodide separates. The crystallization is favored by cooling with ice.

Correspondingly with the production of the intermediate product from 2-methyl-benzthiazole-ethyl-iodide and α-methyl phenmorpholine corresponding intermediate products may be obtained with quaternary salts of other heterocyclic bases.

| | Absorption maximum, A. U. |
|---|---|
| Intermediate product from 2-methyl benzselenazole ethyl iodide | 6180 |
| Intermediate product from β-naphtho-thiazole ethyl iodide | 6230 |
| Intermediate product from 2:5:6-trimethyl benzselenazole ethyl iodide | 6200 |
| Intermediate product from quinaldine ethyl iodide | About 6100 (very flat) |
| Intermediate product from lepidine ethyl iodide | About 6400 |
| Intermediate product from 2-methyl-benzthiazole methyl iodide | 6100 |
| Intermediate product from 2-methyl-6-ethoxy-benzthiazole ethyl iodide | About 6150 (very flat) |
| Intermediate product from 2:5:6-trimethyl-benzthiazole ethyl iodide | 6100 (somewhat depressed) |
| Intermediate product from β-naphthothiazole-di-methyl sulfate | 6250 (somewhat sharp) |

As will be seen from the foregoing remarks the process according to the present invention is not limited to the reaction of α-methyl-phenmorpholine with any specific heterocyclic bases and their salts, but is generally applicable in all cases where a base having a methylene group capable of reaction in 2- or 4-position is concerned.

In the claims following hereafter the alkaline condensing agent may be any condensing agent used in the art of producing carbocyanines. Examples of these condensing agents are for instance alkylamines, oxalkyl amines, piperidine, pyridine, ethanol-amine and alkali alkylates.

What I claim is:

1. A compound corresponding to the following general formula

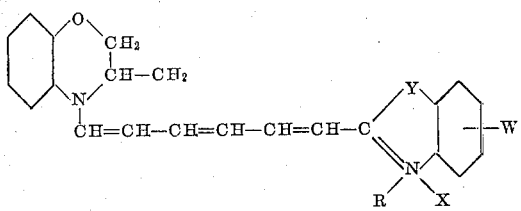

Y being a member of the group consisting of S, Se, —CH=CH—;
W being a member of the group consisting of alkyl, alkoxy, and a fused-on benzene nucleus;
R being alkyl;
X being an anion.

2. A compound corresponding to the following formula:

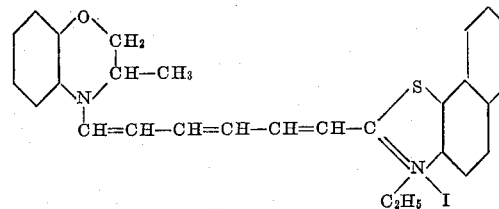

3. A compound corresponding to the following formula:

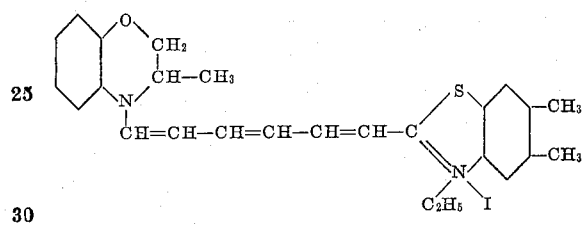

4. A compound corresponding to the following formula:

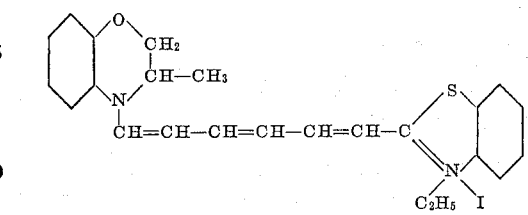

5. A process of producing hexamethine compounds which comprises reacting equivalent quantities of a quaternary ammonium salt of a heterocyclic base having a reactive methylene group and a pentamethine dyestuff of the following formula

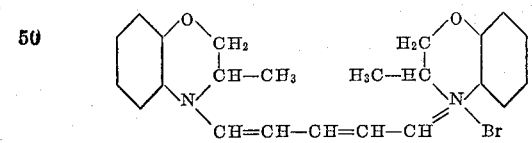

in an organic solvent containing an alkaline condensing agent.

WALTER ZEH.